(12) United States Patent
Koyama et al.

(10) Patent No.: US 8,435,149 B2
(45) Date of Patent: May 7, 2013

(54) REDUCTION GEAR DEVICE

(75) Inventors: Ryuhei Koyama, Tsu (JP); Toshiharu Hibino, Tsu (JP); Masakazu Kurita, Tsu (JP); Jun Hirose, Tsu (JP)

(73) Assignee: Nabtesco Corporation, Tokyo (JP)

( * ) Notice: Subject to any disclaimer, the term of this patent is extended or adjusted under 35 U.S.C. 154(b) by 1253 days.

(21) Appl. No.: 12/223,471

(22) PCT Filed: Feb. 6, 2007

(86) PCT No.: PCT/JP2007/052050
§ 371 (c)(1),
(2), (4) Date: Jul. 31, 2008

(87) PCT Pub. No.: WO2007/091568
PCT Pub. Date: Aug. 16, 2007

(65) Prior Publication Data
US 2009/0036250 A1 Feb. 5, 2009

(30) Foreign Application Priority Data
Feb. 7, 2006 (JP) .................................. 2006-029323

(51) Int. Cl.
*F16H 1/32* (2006.01)

(52) U.S. Cl.
USPC ........................................................ 475/162

(58) Field of Classification Search .................. 475/162, 475/168, 178
See application file for complete search history.

(56) References Cited

U.S. PATENT DOCUMENTS

| 4,690,010 | A | 9/1987 | Matsumoto et al. |
| 5,292,289 | A | 3/1994 | Ogata et al. |
| 6,761,660 | B2 * | 7/2004 | Lim ............................. 475/179 |
| 7,476,174 | B2 * | 1/2009 | Fujimoto ..................... 475/177 |
| 2004/0248688 | A1 | 12/2004 | Shimada |
| 2009/0036250 | A1 | 2/2009 | Koyama et al. |

FOREIGN PATENT DOCUMENTS

EP       0 188 233 A2    7/1986
(Continued)

OTHER PUBLICATIONS

Chinese Office Action dated Nov. 29, 2010 in corresponding Chinese Application No. 200780004847.5 (with translation).

(Continued)

*Primary Examiner* — David D Le
*Assistant Examiner* — Erin D Bishop
(74) *Attorney, Agent, or Firm* — Oliff & Berridge, PLC

(57) ABSTRACT

A reduction gear device includes a first reduction mechanism and a second reduction mechanism. The second reduction mechanism includes a crankshaft, an external gear and an internal gear. One of the internal gear and the external gear is fixed to a base part side member of a robot arm of an industrial robot, and the other of the internal gear and the external gear is fixed to an anterior end side member of the robot arm of the industrial robot. An inner diameter D of the internal gear is 140 mm$\leq$D$\leq$200 mm, torque T transmitted to the anterior end side member is 650 Nm$\leq$T$\leq$1960 Nm, and the number of teeth N of the internal gear is less than 40 times the difference in the number of teeth between the internal gear and the external gear.

20 Claims, 8 Drawing Sheets

FOREIGN PATENT DOCUMENTS

| | | |
|---|---|---|
| EP | 0 866 238 A1 | 9/1998 |
| EP | 1 798 444 A1 | 6/2007 |
| JP | A-62-218087 | 9/1987 |
| JP | A-62-218088 | 9/1987 |
| JP | A-63-185595 | 8/1988 |
| JP | A-03-181641 | 8/1991 |
| JP | A-7-299791 | 11/1995 |
| JP | A-07-308882 | 11/1995 |
| JP | A-10-110793 | 4/1998 |
| JP | A-11-198086 | 7/1999 |
| JP | A-2004-211761 | 7/2004 |
| JP | A-2004-301273 | 10/2004 |
| WO | WO 00/49112 A1 | 8/2000 |
| WO | WO 2005072067 * | 8/2005 |
| WO | WO 2007/091568 A1 | 8/2007 |

OTHER PUBLICATIONS

Chinese Office Action mailed Apr. 6, 2012 in Chinese Patent Application No. CN200780004847.5 (with translation).

May 17, 2010 Office Action issued in European Patent Application No. 07 713 879.0.

International Search Report issued in International Patent Application No. PCT/JP2007/052050 on May 22, 2007 (with English translation).

Office Action issued in corresponding Japanese Patent Application No. 2007-024007 dated Jan. 25, 2011 (with translation).

Oct. 23, 2012 Office Action issued in Chinese Patent Application No. 200780004847.5.

* cited by examiner

REDUCTION GEAR DEVICE

TECHNICAL FIELD

The present application claims priority to Japanese Patent Application No. 2006-029323 filed on Feb. 7, 2006.

The present invention relates to a reduction gear device attached to an industrial robot. In particular, the present invention relates to a reduction gear device that can be used suitably in a wrist of an industrial robot, and relates to a reduction gear device that reduces the number of revolutions applied to an input shaft, and that causes the revolution of a member that comprises a part located to the anterior of a wrist joint of the industrial robot.

BACKGROUND ART

A reduction gear device attached to a joint of an industrial robot, that reduces the number of revolutions applied to an input shaft, and that causes the revolution of a member that comprises a part located to the anterior of the joint is known to the art. This reduction gear device must have a large speed reducing capacity while being compact, comprises an external gear and an internal gear having a differing number of teeth than the external gear, and utilizes the phenomenon of the internal gear and the external gear revolving relative to one another when the external gear that is meshed with the internal gear revolves eccentrically. The basic configuration thereof is set forth in Japanese Patent Application Publication No. S62-218087. The reduction gear device set forth in Japanese Patent Application Publication No. S62-218087 comprises a crankshaft that, by means of rotation, causes an eccentric cam to revolve eccentrically, and an external gear that engages with the eccentric cam, the eccentric cam revolving eccentrically when the crankshaft is rotated, whereupon the external gear revolves eccentrically.

In the case where the rotation of the external gear is not allowed, the internal gear rotates around a center axis of an output shaft. Conversely, in the case where the rotation of the internal gear is not allowed, the external gear rotates while revolving orbitally around the center axis of the output shaft. The number of rotations applied to the input shaft can be reduced and can be transmitted to the output shaft by means of transmitting the rotation of the internal gear or the external gear to the output shaft.

It is often the case that an industrial robot has a plurality of joints and that each joint utilizes a reduction gear device. An industrial robot having a reduction gear devices attached to joints is set forth in Japanese Patent Application Publication No. S63-185595. The industrial robot set forth in Japanese Patent Application Publication No. S63-185595 has three joints at wrist portions of robot arm, and three reduction gear devices are built into these wrist portions.

FIG. 4 shows a schematic diagram of an industrial robot 30. The industrial robot 30 has a first joint 31, a second joint 32, a third joint 33, a fourth joint 34, a fifth joint 35, and a sixth joint 36. That is, the industrial robot 30 operates with the revolutionary movement of six shafts being combined.

The first joint 31 is fixed to an installing face, and is capable of rotating around a center axis CL1. The second joint 32 is capable of rotating around a center axis 38. The third joint 33 is capable of rotating around a center axis 40. The fourth joint 34 is capable of rotating around a center axis CL2. The fifth joint 35 is capable of rotating around a center axis 42. The sixth joint 36 is capable of rotating around a center axis CL3, a robot hand (not shown) is fixed to an anterior end of the sixth joint 36, by which work (an object being worked upon) is moved or processed.

A reduction gear device is built into each of the joints 31, 32, 33, 34, 35, and 36. The first joint 31, the second joint 32, and the third joint 33 are termed to be the three basic shafts of the industrial robot 30. The fourth joint 34, the fifth joint 35, and the sixth joint 36 are termed to be the three wrist shafts of the industrial robot 30, and form an anterior end part of a base part arm 52 of the robot. The fourth joint 34 comprises a reduction mechanism that reduces the number of revolutions of a motor 46 attached to a shoulder part 44 and causes a member located at the anterior side of the fourth joint 34 to rotate around the center axis CL2. The fifth joint 35 comprises a reduction mechanism that reduces the number of revolutions of a motor 48 attached to the shoulder part 44 and causes a member located at the anterior side of the fifth joint 35 to rotate around the center axis 42. The sixth joint 36 comprises a reduction mechanism that reduces the number of revolutions of a motor 50 attached to the shoulder part 44 and causes a member located at the anterior side of the sixth joint 36 to rotate around the center axis CL3.

FIG. 5 shows a diagram of a torque transmitting circuit of the three wrist shafts of the industrial robot 30. The motor 50 is not shown.

The torque of the motor 46 is transmitted to a hollow shaft 14 via a spur gear 14a. The hollow shaft 14 passes through the base part arm 52 of the robot, the torque is transmitted therethrough to the reduction gear device of the fourth joint 34, and causes the member at the anterior side of the fourth joint 34 to revolve in the direction of an arrow 41.

The torque of the motor 48 is transmitted to a hollow shaft 15 via a gear 15a. The hollow shaft 15 passes through the hollow shaft 14, and transmits the torque to a gear 15b. The gear 15b is orthogonal to and meshes with a gear 15c, and the direction of revolution between the gear 15b and the gear 15c is changed by 90 degrees. The torque transmitted to the gear 15c is transmitted to the reduction gear device of the fifth joint 35, and causes the member at the anterior side of the fifth joint 35 to revolve in the direction of an arrow 43.

The torque of the motor 50 (not shown) is transmitted to a shaft 17 via a gear 17a. The shaft 17 passes through the hollow shaft 15, and transmits the torque to a gear 17b. The gear 17b is orthogonal to and meshes with a gear 17c, and the torque transmitted to the gear 17c is transmitted to a spur gear 17e by a spur gear 17d that is fixed to the gear 17c. The direction of revolution is changed by 90 degrees when the torque is transmitted from the gear 17b to the gear 17c. The torque transmitted to the gear 17e is transmitted to a gear 17f that is fixed to the gear 17e and is orthogonal to and meshes with a gear 17g. The direction of revolution is changed by 90 degrees when the torque is transmitted from the gear 17f to the gear 17g, and the direction of revolution of the gear 17g becomes the same as the direction of revolution of the motor 50. The torque transmitted to the gear 17g is transmitted to the reduction gear device of the sixth joint 36, and causes the member at the anterior side of the sixth joint 36 to revolve in the direction of an arrow 45.

DISCLOSURE OF INVENTION

Problem to be Solved by the Invention

Increasingly severe demands are being placed upon industrial robots. The work pieces, etc. to be moved by industrial robots are becoming increasingly heavier, requiring an increase in the torque T transmitted to an output shaft. Further, the rate of operation of industrial robots is becoming increasingly greater. Here, rate of operation refers to a rate wherein the time that the robot is operating in a load bearing state is divided by the time that the robot is operating. The time in which robots are operating in a load bearing state is becoming longer, while the time in which the robots are halted is becoming shorter. Meanwhile, there is a demand for the arms to become lighter and smaller in diameter.

In response to the demands placed upon industrial robots, the reduction gear devices utilized while being attached to the joints of the robots are also required to be capable of transmitting a heavy load while being small in size, and are required to have a high degree of durability (long life) even when being utilized at a high rate of operation.

It was found from the research of the present inventors that the durability of the reduction gear device is highly affected by the temperature of the reduction gear device. The reduction gear device generates heat when the reduction gear device is utilized at a high rate of operation in a state where a high torque is being transmitted to the output shaft. When the reduction gear device becomes hot, lubricant (oil, grease, etc.) that has been encapsulated into the reduction gear device becomes heated. The lubricant is sealed within the reduction gear device by a sealing member, a robot member, or the like.

The viscosity of the lubricant decreases as its temperature rises, and the lubricant has the property that oil film strength is weakened in proportion to the rise in temperature. That is, the durability of the reduction gear device is highly affected by the temperature of the reduction gear device. The lubricant becomes hot when the reduction gear device is utilized at a high rate of operation in a state where a high torque is being transmitted to the output shaft of the reduction gear device, and the durability of the reduction gear device degrades radically. As increasing torque is being required for the output shaft of industrial robots and higher rates of operation are being required of industrial robots, heating of the reduction gear device has become a serious problem, and the reduction in durability of the reduction gear device has become a serious problem.

In the case where an inner diameter D of the internal gear is 140 mm$\leq$D$\leq$200 mm, and torque T transmitted to an anterior end side member of a robot arm is 650 Nm$\leq$T$\leq$1570 Nm, or in the case where the inner diameter D of the internal gear is 100 mm$\leq$D<140 mm, and the torque T transmitted to the anterior end side member of the robot arm is 290 Nm$\leq$T<650 Nm, the temperature rises in the lubricant of a conventional reduction gear device, and the durability of the reduction gear device decreases greatly if the reduction gear device is utilized at a high rate of operation in a state where a high load is being transmitted. Further, it was found in the succeeding research that, similar to the aforementioned case, in the case where the inner diameter D of the internal gear is 140 mm$\leq$D$\leq$200 mm, and the torque T transmitted to the anterior end side member of the robot arm is 650 Nm$\leq$T$\leq$1960 Nm, the durability of the conventional reduction gear device decreases greatly if the reduction gear device is utilized at a high rate of operation in a state where a high load is being transmitted.

Means to Solve the Problem

Increasing the thermal radiation performance of the reduction gear device is effective in countering the reduction in durability of the reduction gear device since it suppresses the increase in heat of the reduction gear device. However, increasing the thermal radiation performance of the reduction gear device entails an increase in the size of the reduction gear device. As described above, there is a demand for robot arms to become smaller in diameter and lighter, and there is also a demand for the reduction gear devices attached to the joints of the robot arm to become smaller. It is thus difficult to counter the reduction in durability of the reduction gear device by improving the thermal radiation performance of the reduction gear device.

To deal with this, it has become important to suppress the generation of heat by the reduction gear device. The reduction gear device embedded in the joint portion of the robot utilizes a pair of gears for connecting the reduction gear device and an input shaft. Often, a first reduction mechanism is realized by this pair of gears, and then a second reduction mechanism that performs a large amount of speed reduction is joined thereto. The reduction mechanism that utilizes an internal gear meshed with the eccentrically revolving external gear is the second reduction mechanism. Below, the first reduction mechanism and the second reduction mechanism that are joined together will be termed as reduction gear device.

The reduction mechanism that utilizes the internal gear meshed with the eccentrically revolving external gear can be compact, and yet cause a great amount of speed reduction. In the conventional reduction gear device, the second reduction mechanism is mainly designed. The speed reduction ratio of the first reduction mechanism that includes the pair of gears can be adjusted in a comparatively simple manner. As a result, after the second reduction mechanism has been determined to have an allowable size and the magnitude of the torque transmitted, the speed reduction ratio of the first reduction mechanism is determined based on the speed reduction ratio of the second reduction mechanism and the total speed reduction ratio of which the reduction gear device requires.

It was found from the research of the present inventors that there is a problem in the aforementioned design concept. For example, a case can be considered where the revolutions of 1000 rpm of an input shaft are to be reduced to 10 rpm by a reduction gear device. In this case, the reduction gear device having a total speed reduction ratio of 100 is required.

In the case where a reduction gear device having a total speed reduction ratio of 100 is to be formed, the first reduction mechanism can have a speed reduction ratio of 2.5 and the second reduction mechanism can have a speed reduction ratio of 40, the first reduction mechanism can have a speed reduction ratio of 3.3 and the second reduction mechanism can have a speed reduction ratio of 30, or the first reduction mechanism can have a speed reduction ratio of 4 and the second reduction mechanism can have a speed reduction ratio of 25. It would ordinarily be anticipated that, as long as the total speed reduction ratio is 100, the total amount of heat generated by the reduction gear device would be the same whichever of the above combinations is utilized. In the conventional art, the combination of the speed reduction ratio of the first reduction mechanism and the speed reduction ratio of the second reduction mechanism was determined without taking into account the effects on the total amount of heat generated. The second reduction mechanism does in fact require a structure that is more complex and precise than that of the first reduction mechanism. For this reason, after several types of second reduction mechanism were provided and the second reduction mechanism was selected out of these, the tooth ratio of the pair of gears forming the first reduction mechanism was adjusted, thereby realizing the required total speed reduction ratio of the reduction gear device. It was not conventionally recognized that, when the reduction gear device was manufactured with the above method, the amount of heat generated by the reduction gear device differs according to the combination of the speed reduction ratio of the first reduction mechanism and the speed reduction ratio of the second reduction mechanism.

However, it was discovered from the research of the present inventors that the total amount of heat generated by the reduction gear device may differ according to the combination of the speed reduction ratio of the first reduction mechanism and the speed reduction ratio of the second reduction mechanism even though the same total speed reduction ratio is achieved. The present inventors discovered that the total amount of heat generated becomes smaller if the speed reduction ratio of the first reduction mechanism was increased and the speed reduction ratio of the second reduction mechanism was decreased. A new design method for suppressing the amount of heat generated by the reduction gear device has been identified based on this finding.

In the conventional design method, a second reduction mechanism capable of being compact and yet causing a great amount of speed reduction was principal to the design, and in order to provide the characteristics of the second reduction mechanism, for example, a second reduction mechanism having a speed reduction ratio of 40, a second reduction mechanism having a speed reduction ratio of 52, a second reduction mechanism having a speed reduction ratio of 60, etc. were provided. If the speed reduction ratio of the second reduction mechanism is less than 40, it is necessary to increase the speed reduction ratio of the first reduction mechanism, and consequently the advantage of the second reduction mechanism being compact and yet causing a great amount of speed reduction could not be realized.

In the conventional design method, in the case where the inner diameter D of the internal gear is 140 mm$\leq$D$\leq$200 mm, and the torque T transmitted to the anterior end side member of the robot arm is 650 Nm$\leq$T$\leq$1570 Nm, the lowest speed reduction ratio of the second reduction mechanism was 40.

Further, in the case, also, where the inner diameter D of the internal gear is 140 mm$\leq$D$\leq$200 mm, and the torque T transmitted to the anterior end side member of the robot arm is 650 Nm$\leq$T$\leq$1960 Nm, the lowest speed reduction ratio of the second reduction mechanism was 40.

Further, in the case where the inner diameter D of the internal gear is 100 mm$\leq$D<140 mm, and the torque T transmitted to the anterior end side member of the robot arm is 290 Nm$\leq$T<650 Nm, the lowest speed reduction ratio of the second reduction mechanism was 30.

It was confirmed by the research of the present inventors that in the case where the inner diameter D of the internal gear is 140 mm$\leq$D$\leq$200 mm, and the torque T transmitted to the anterior end side member of the robot arm is 650 Nm$\leq$T$\leq$1570 Nm or 650 Nm$\leq$T$\leq$1960 Nm, the speed reduction ratio of the second reduction mechanism of 40 or greater is not the most suitable design from the viewpoint of the total amount of heat generated by the reduction gear device, and it was ascertained that it was possible to suppress the total amount of heat generated by the reduction gear device by suppressing the speed reduction ratio of the second reduction mechanism to less than 40 (and by increasing the speed reduction ratio of the first reduction mechanism accordingly so that the total speed reduction ratio remains the same).

The graph of FIG. 6 shows the relationship between a temperature increase of the reduction gear device and the number of revolutions of the output shaft of the reduction gear device. The vertical axis of the graph shows the temperature increase of the reduction gear device (° C.), and the horizontal axis of the graph shows the number of revolutions (rpm). The numbers in the figure show the number of teeth of the internal gear, and are equivalent to the speed reduction ratio of the second reduction mechanism. The speed reduction ratio of the first reduction mechanism is adjusted so as to be in inverse proportion to the speed reduction ratio of the second reduction mechanism, and the total speed reduction ratio of the reduction gear device is approximately 80 among all of the curves. Further, the torque transmitted to the output shaft is 690 Nm among all of the curves, and the size of the second reduction mechanism is identical. Among all of the curves, the torque and the number of revolutions input to the input shaft are identical, and the torque and the number of revolutions transmitted to the output shaft are identical. That is, the amount of work performed by the reduction gear device is identical in all of the curves.

The curve C52 shows the relationship between the number of output revolutions of the reduction gear device and the temperature increase of the reduction gear device in the case where the speed reduction ratio of the second reduction mechanism is 52, the curve C40 shows the relationship between the number of output revolutions and the temperature increase in the case where the speed reduction ratio of the second reduction mechanism is 40, and the curve C28 shows the relationship between the number of output revolutions and the temperature increase in the case where the speed reduction ratio of the second reduction mechanism is 28. The temperature increases in FIG. 6 show the temperature difference, when the reduction gear device was operating continuously at the set number of output revolutions, between the temperature before the reduction gear device is operating continuously and the temperature at a state where temperature is no longer changing.

As is clear from FIG. 6, it can be understood that the temperature of the reduction gear device increases when the number of output revolutions is high. This shows that, when the amount of work performed by the reduction gear device is increased, the temperature of the reduction gear device is increased correspondingly.

If the amount of work performed by the reduction gear device and the amount of heat generated were to correspond, it would be expected that the curve C52, the curve C40, and the curve C28 would be identical. This is because the total speed reduction ratio of the reduction gear device is the same, and the amount of work performed is the same. However, the curve C52, the curve C40, and the curve C28 are not identical. It can be clearly understood that the total amount of heat generated is large when the speed reduction ratio of the second reduction mechanism is greater (see the curve C52), even though the speed reduction ratio of the first reduction mechanism is correspondingly smaller, and that by contrast the total amount of heat generated is small when the speed reduction ratio of the second reduction mechanism is smaller (see the curve C28), even though the speed reduction ratio of the first reduction mechanism is correspondingly greater.

It can thus be understood that the higher the number of output revolutions, the greater the difference in the total amount of heat generated. The difference in total amount of heat generated, which was not prominent while the number of output revolutions was low, increases when the number of output revolutions becomes higher.

The graph of FIG. 7 shows operating time of the reduction gear device on the horizontal axis, and amount of iron powder generated by the reduction gear device on the vertical axis. The amount of iron powder that is adulterated in lubricant that had been encapsulated into the reduction gear device has been measured, and it corresponds to the amount of abrasion generated in the reduction gear device. Moreover, the reduction gear device is utilized in a state where the lubricant was encapsulated therein and sealed.

The curve C70 shown in FIG. 7 shows the case where the reduction gear device is operated continuously at a predetermined load. Although the amount of abrasion increases in proportion to the operation time of the reduction gear device for a predetermined period from the time that operation of the reduction gear device had begun (this may hereinafter be termed as initial abrasion phenomenon), a stable period 72 is then reached in which the pace of increase in abrasion is low. It is shown that the operation of the reduction gear device can continue at this low pace of increase in abrasion until just prior to the end of the operating life of the reduction gear device.

The curve 68 on the other hand shows the case where a reduction gear device, in which the total speed reduction ratio is the same but the speed reduction ratio of the second reduction mechanism is higher, is operated continuously at a predetermined load. The pace of abrasion of the reduction gear device progresses faster than the pace of initial abrasion of the curve 70. The fast pace of abrasion is maintained from the time when the operation of the reduction gear device began, and the stable period 72 can not be obtained.

Further, it was discovered from the research of the present inventors that another speed reduction ratio range exists in the case where the inner diameter D of the internal gear is small and the output torque T is small. That is, it was ascertained that, in the case where the inner diameter D of the internal gear is 100 mm$\leq$D<140 mm, and the torque T transmitted to the anterior end side member of the robot arm is 290 Nm$\leq$T<650 Nm, the decrease in durability of the reduction gear device can be held back by suppressing the speed reduction ratio of the second reduction mechanism to less than 30 (which in accordance requires the speed reduction ratio of the first reduction mechanism to be increased).

It was determined from the research of the present inventors that the total amount of heat generated by the reduction gear device can be suppressed, and the decrease in the durability of the reduction gear device can be avoided, by suppressing the speed reduction ratio of the second reduction mechanism to less than 40 in the case where the inner diameter D of the internal gear is 140 mm$\leq$D$\leq$200 mm, and the torque T transmitted to the anterior end side member of the robot arm is 650 Nm$\leq$T$\leq$1570 Nm; and by suppressing the speed reduction ratio of the second reduction mechanism to less than 30 (which in accordance requires the speed reduction ratio of the first reduction mechanism to be increased) in the case where the inner diameter D of the internal gear is 100 mm$\leq$D<140 mm, and the torque T transmitted to the anterior end side member of the robot arm is 290 Nm$\leq$T<650 Nm.

As described above, it is possible to obtain a stable period in which the pace of abrasion was low when the reduction gear device is operated in a state in which the temperature of the lubricant is low. However, the reduction gear device might not fulfill its intended durability even though the stable period is obtained. The durability of the reduction gear device is represented by a rated life period. The rated life period is a life period when the reduction gear device is operated at a rated torque and a rated number of output revolutions, and is approximately 6000 to 8000 hours. As described above, the work etc. to be moved by robots is growing heavier, and the rate of operation of industrial robots is growing higher. Reduction gear devices that were capable of fulfilling the rated life period under conventional operating conditions may not fulfill the rated life period under conditions where the rate of operation is high and torque is high. If the durability of the reduction gear device becomes shorter than the rated life period, the reduction gear device may break while the robot is operating, and it may become necessary to frequently perform maintenance and inspection of the robot.

In the reduction gear device, the density of the iron powder adulterated within the lubricant encapsulated into the interior of the reduction gear device (the density may hereinafter be termed as the iron powder density) is increased by the abrading of the reduction gear device. When the iron powder density reaches 1000 ppm or above, the movable parts of the reduction gear device are in a state of being excessively abraded. Further, when the lubricant (the lubricant in which the iron powder density has reached 1000 ppm or above) is present between the movable parts of the reduction gear device, these movable parts become further abraded. That is, the abrasion of the reduction gear device progresses at a greater speed when the iron powder density has reached 1000 ppm or above, which consequently damages the reduction gear device. The reduction gear device is required to have durability that would maintain the iron powder density to be less than 1000 ppm after being operated for the rated life period.

Conditions were clarified from the research of the present inventors whereby the durability of the reduction gear device fulfills the rated life period even if the reduction gear device is utilized under a condition in which the rate of operation is high and torque is high.

The graph in FIG. 9 shows operating time of the reduction gear device on the horizontal axis, and iron powder density (unit: ppm) in the lubricant encapsulated into the reduction gear device on the vertical axis. In the curves C1 to C6, the magnitude of the speed reduction ratio of the second reduction mechanism can be represented in the order of C1<C2<C3<C4<C5<C6 (the total speed reduction ratio of the reduction gear device is identical). In the curves C1 to C5, the pace of abrasion is high (that is, the slope of the graph is steep) due to the initial abrasion during the predetermined period from the time when the operation of the reduction gear device started, and the pace of abrasion is low after the predetermined period has passed (that is, the slope of the graph is moderate). That is, the curves C1 to C5 have a stable period in which the pace of abrasion of the reduction gear device is low. However, the durability of the reduction gear device does not fulfill the rated life period in the curve C5 even though a stable period is present. The iron powder density exceeds 600 ppm in the curve C5 before the stable period is reached, and further exceeds 1000 ppm before the rated life period is reached. As described above, the abrasion of the reduction gear device progresses at greater speed when the iron powder density reaches 1000 ppm or above, and consequently, the reduction gear device is damaged.

In the curve C5, the iron powder density exceeds 600 ppm before the stable period is reached. As described above, when a large amount of iron powder is intermixed into the lubricant, this iron powder scrapes the movable parts of the reduction gear device. That is, it was clarified that, even though the stable period is present in which the pace of abrasion is low, the pace of abrasion during the stable period can not be significantly suppressed if the iron powder density exceeds 600 ppm before the stable period is reached.

As shown in the curves C1 to C4, the durability of the reduction gear device fulfills the rated life period in the case where the iron powder density is 600 ppm or below when the stable period is reached. That is, the iron powder density does not reach 1000 ppm when the rated life period is reached. Moreover, the curve C6 continues increasing without having a stable period.

The curve C1 can be obtained by having the speed reduction ratio of the second reduction mechanism be 30 or below in the case where the inner diameter D of the internal gear is 140 mm≦D≦200 mm, and the torque T transmitted to the anterior end side member of the robot arm is 650 Nm≦T≦1570 Nm.

The present invention is a reduction gear device created in the enlightenment of the aforementioned findings, and is utilized in a joint portion of an industrial robot. The reduction gear device of the present invention is provided with a first reduction mechanism and a second reduction mechanism.

The first reduction mechanism comprises a first spur gear that rotates integrally with an input shaft, and a second spur gear that meshes with the first spur gear.

The second reduction mechanism comprises a crankshaft that rotates integrally with the second spur gear and that, together with its rotation, causes the eccentric revolution of an eccentric cam, an external gear that revolves eccentrically while engaged with the eccentric cam, and an internal gear that contains the external gear while in an engaged state therewith and allows the eccentric revolution of the external gear, and that has a number of teeth differing from the number of teeth of the external gear.

The reduction gear device of the present invention may be utilized while the internal gear is fixed to a base part side member of a robot arm, and a carrier that follows the rotation of the external gear when this external gear rotates is fixed to an anterior end side member of the robot arm. Alternatively, the reduction gear device may be utilized while the external gear is fixed to the base part side member of the robot arm, and the internal gear is fixed to the anterior end side member of the robot arm.

In the reduction gear device of the present invention, in the case where an inner diameter D of the internal gear satisfies the relationship 140 mm≦D≦200 mm, and torque T transmitted to the anterior end side member of the robot arm is 650 Nm≦T≦1570 Nm, the trend of increase in density of the iron powder in lubricant (the iron powder adulterated into the lubricant) sealed within the reduction gear device is great during a predetermined period from a time that operation of the reduction gear device begins; this trend changes to a small pace of increase after the predetermined period has passed, and the iron powder density in the lubricant is set to be less than or equal to 600 ppm when this change in the trend of increase occurs.

According to the aforementioned reduction gear device, in the case where the inner diameter D of the internal gear is 140 mm≦D≦200 mm, and the torque T transmitted to the anterior end side member of the robot arm is within the range 650 Nm≦T≦1570 Nm, it is possible to obtain a stable period in which the trend of increase in the iron powder density is small after the predetermined period from the time that operation of the reduction gear device began has passed. Since the iron powder density is small when the stable period is reached, it is possible to markedly suppress the abrading of the reduction gear device during the stable period. A reduction gear device in which durability fulfills the rated life period can thus be obtained.

In another reduction gear device of the present invention, in the case where an inner diameter D of the internal gear satisfies the relationship 140 mm≦D≦200 mm, and torque T transmitted to the anterior end side member of the robot arm is 650 Nm≦T≦1960 Nm, the trend of increase in density of iron powder in lubricant sealed within the reduction gear device is great for a predetermined period from a time that operation of the reduction gear device begins and this trend changes to a small pace of increase after the predetermined period has passed, and the iron powder density in the lubricant is set to be less than or equal to 600 ppm when this change in the trend of increase occurs.

In the aforementioned reduction gear device, a reduction gear device in which abrasion of the reduction gear device during the stable period is markedly suppressed and whose durability fulfills the rated life period can also be obtained.

In the reduction gear device of the present invention, it is preferable that the inner diameter D of the internal gear is 140 mm≦D≦200 mm, and the torque T transmitted to the anterior end side member is 650 Nm≦T≦1570 Nm or 650 Nm≦T≦1960 Nm, the iron powder density in the lubricant is less than or equal to 600 ppm when the change in the trend of increase of iron powder density occurs, and a number of teeth N of the internal gear is less than 40 times the difference in the number of teeth between the internal gear and the external gear.

As described above, it is possible to decrease the total amount of heat generated by the reduction gear device by suppressing the speed reduction ratio of the reduction mechanism having the internal gear and the external gear (which is the second reduction mechanism) to less than 40. The speed reduction ratio of the second reduction mechanism is obtained by dividing the number of teeth N of the internal gear by the difference in the number of teeth between the internal gear and the external gear, and the speed reduction ratio of the second reduction mechanism can be suppressed to less than 40 if the number of teeth N of the internal gear is set to be less than 40 times the difference in the number of teeth between the internal gear and the external gear. That is, the heating of the reduction gear device can be mitigated by having the difference in the number of teeth between the internal gear and the external gear be less than 40. The durability of the reduction gear device can reliably fulfill the rated life period.

A small reduction gear device can also be set forth in the present invention. In the case where an inner diameter D of the internal gear satisfies the relationship 100 mm≦D<140 mm, and torque T transmitted to the anterior end side member of the robot arm is 290 Nm≦T<650 Nm, the trend of increase in density of iron powder in lubricant sealed within the reduction gear device is great for a predetermined period from a time that operation of the reduction gear device begins and this trend changes to a small pace of increase after the predetermined period has passed, and the iron powder density in the lubricant is set to be less than or equal to 600 ppm when this change in the trend of increase occurs.

In the aforementioned reduction gear device, it is possible to markedly suppress the abrasion of the reduction gear device during the stable period and to obtain a reduction gear device in which durability fulfills the rated life period as a result of the trend of increase in iron powder density in the lubricant being great for the predetermined period from the time that operation of the reduction gear device begins and this trend changing to a small pace of increase after the predetermined period has passed, and the iron powder density in the lubricant being set to be less than or equal to 600 ppm when this change in the trend of increase occurs.

In the reduction gear device of the present invention, it is preferable that the lubricant sealed within the reduction gear device is a lubricant obtained by mixing lithium soap and extreme pressure agents such as organic molybdenum, sulfur, phosphorus, zinc, etc. with a base oil comprising of synthetic hydrocarbon oil and refined mineral oil.

As described above, when the reduction gear device is operating, it is important for the iron powder density in the lubricant to be suppressed before the stable period is reached.

The aforementioned lubricant has a friction factor of less than or equal to 0.08, and is capable of keeping the amount of abrasion of the reduction gear device small from the time that operation of the reduction gear device begins until the stable period is reached. The friction factor refers to a value that is measured utilizing an SRV test device known for testing vibrant frictional abrasion.

Furthermore, a reduction gear device that is determined by the relationship of an inner diameter D of the internal gear, torque T transmitted to an anterior end of a robot arm, and a number of teeth N of the internal gear can be set forth in the present invention.

The reduction gear device of the present invention is also utilized by being attached to a joint portion of an industrial robot, and is provided with a first reduction mechanism and a second reduction mechanism.

The first reduction mechanism comprises a first spur gear that rotates integrally with an input shaft, and a second spur gear that meshes with the first spur gear.

The second reduction mechanism comprises a crankshaft that rotates integrally with the second spur gear and that, together with its rotation, causes the eccentric revolution of an eccentric cam, an external gear that revolves eccentrically while being engaged with the eccentric cam, and an internal gear that contains the external gear while being in an engaged state therewith and allows the eccentric revolution of the external gear, and that has a number of teeth differing from the number of teeth of the external gear.

The reduction gear device of the present invention may be utilized while the internal gear is fixed to a base part side member of a robot arm, and a carrier that follows the rotation of the external gear when this external gear rotates is fixed to an anterior end side member of the robot arm. Alternatively, the reduction gear device may be utilized while the external gear is fixed to the base part side member of the robot arm, and the internal gear is fixed to the anterior end side member of the robot arm.

There is a demand for the reduction gear devices that is to be attached to the wrists of industrial robots to be compact, and in the reduction gear device of the present invention the number of teeth N of the internal gear may be set to be less than 40 times the difference in the number of teeth between the internal gear and the external gear in the case where an inner diameter D of the internal gear fulfills the relationship 140 mm$\leq$D$\leq$200 mm, and torque T transmitted to the anterior end side member of the robot arm is 650 Nm$\leq$T$\leq$1570 Nm. As described above, the speed reduction ratio of the second reduction mechanism may be obtained by dividing the number of teeth N of the internal gear by the difference in the number of teeth between the internal gear and the external gear, and the speed reduction ratio of the second reduction mechanism can be suppressed to less than 40 if the number of teeth N of the internal gear is set to be less than 40 times the difference in the number of teeth between the internal gear and the external gear.

In the case where the inner diameter D of the internal gear is 140 mm$\leq$D$\leq$200 mm, and the torque T transmitted to the anterior end side member of the robot arm is within the range 650 Nm$\leq$T$\leq$1570 Nm, the total amount of heat will increase as described in FIG. 6 if the speed reduction ratio of the second reduction mechanism is 40 or above, as in the conventional case, and it is not possible to obtain the stable period 72 which was described in FIG. 7. However, if the speed reduction ratio of the second reduction mechanism is suppressed to be below 40, the total amount of heat is controlled to be low even though the speed reduction ratio of the first reduction mechanism is increased in compensation, and the stable period 72 described in FIG. 7 can be obtained.

According to the present invention, it is possible to suppress the total amount of heat of the reduction gear device that is required to cause the output shaft to revolve at a high speed and transmit a high torque to the output shaft for the demand to move heavy objects at high speed. Since overheating of the lubricant can be prevented and the stable period can be obtained in which the abrasion pace is slow, it is possible to prevent a decrease in the durability of the reduction gear device that rapidly revolves the output shaft with a high torque.

In the case where an inner diameter D of the internal gear is 140 mm$\leq$D$\leq$200 mm, and torque T transmitted to the anterior end side member of the robot arm is in the range 650 Nm$\leq$T$\leq$1570 Nm, it is preferable that the number of teeth N of the internal gear is set to be less than 30 times the difference in the number of teeth between the internal gear and the external gear.

A reduction gear device in which durability is more markedly increased can be obtained by having the speed reduction ratio of the second reduction mechanism to be 30 or below.

In another reduction gear device of the present invention, in the case where an inner diameter D of the internal gear satisfies the relationship 140 mm$\leq$D$<$200 mm, and torque T transmitted to the anterior end side member of the robot arm is 650 Nm$\leq$T$\leq$1960 Nm, the number of teeth N of the internal gear is set to be less than 40 times the difference in the number of teeth between the internal gear and the external gear.

In the aforementioned reduction gear device, as well, the stable period 72 described in FIG. 7 can be obtained if the speed reduction ratio of the second reduction mechanism is below 40.

In another reduction gear device of the present invention, in the case of a small reduction gear device, i.e. an inner diameter D of the internal gear satisfies the relationship 100 mm$\leq$D$<$140 mm, and torque T transmitted to the anterior end side member of the robot arm is 290 Nm$\leq$T$<$650 Nm, the number of teeth N of the internal gear is set to be less than 30 times the difference in the number of teeth between the internal gear and the external gear.

In the case where the inner diameter D of the internal gear is 100 mm$\leq$D$<$140 mm, and the torque T transmitted to the anterior end side member of the robot arm is within the range 290 Nm$\leq$T$<$650 Nm, the total amount of heat will be increased by the same operation and effects as described in FIG. 6 if the speed reduction ratio of the second reduction mechanism is 30 or above, as in the conventional case. However, if the speed reduction ratio of the second reduction mechanism is below 30, the total amount of heat can be suppressed even if the speed reduction ratio of the first reduction mechanism is increased in compensation.

In the aforementioned reduction gear device, it is preferable that a through hole that passes through the center of the input shaft and the external gear is formed, and an input shaft of another reduction gear device is capable of passing through this through hole.

If the reduction gear device is provided with the through hole, it is possible to attach the reduction gear device to the fourth joint 34 shown in FIG. 5. Since the input shafts 15, 17, etc. of FIG. 5 can extend through this through hole, it is possible to input torque to the reduction gear device for the fifth joint and the sixth joint.

The diameter of the first spur gear fixed to the input shaft tends to be larger in the case where the input shaft is provided with the through hole. In the case of a reduction gear device in which the total diameter is restricted, the diameter of the second spur gear meshed with the first spur gear must be decreased in accordance with the increase of the diameter of the first spur gear. As a result, this is problematic in endowing the first reduction mechanism with a high speed reduction ratio. It is common to increase the speed reduction ratio of the second reduction mechanism and decrease the speed reduction ratio of the first reduction mechanism in the case where the input shaft is provided with the through hole.

It is very much against ordinary practice to suppress the speed reduction ratio of the second reduction mechanism to less than 40 in the case where the inner diameter D of the internal gear is 140 mm≦D≦200 mm and the torque T transmitted to the anterior end side member of the robot arm is in the range 650 Nm≦T≦1570 Nm, and to suppress the speed reduction ratio of the second reduction mechanism to less than 30 in the case where the inner diameter D of the internal gear is 100 mm≦D<140 mm and the torque T transmitted to the anterior end side member of the robot arm is within the range 290 Nm≦T≦650 Nm. The present invention is a novel in that it challenges what has been considered as being antithetical to the ordinary practice.

The difference in the number of teeth of the internal gear and the external gear may be 1, 2, or 3 or more.

Another reduction gear device of the present invention may be utilized while being attached to a joint of an industrial robot. The reduction gear device of the present invention has a first reduction mechanism and a second reduction mechanism. One of an internal gear and an external gear provided in the second reduction mechanism is fixed to a base part side member of a robot arm, and the other of the internal gear and the external gear is fixed to an anterior end side member of the robot arm.

The combination of a speed reduction ratio of the first reduction mechanism and a speed reduction ratio of the second reduction mechanism is capable of being changed, and the reduction gear device can be manufactured selecting speed reduction ratio from within a range in which heating of the reduction gear device is controlled to be low.

In the aforementioned reduction gear device, heating of the reduction gear device may be suppressed by changing the combination of the first reduction mechanism and the second reduction mechanism.

Effects of the Invention

According to the reduction gear device of the present invention, by optimizing the allotment of functions of the first reduction mechanism and the second reduction mechanism, it is possible to suppress the decrease in durability of the reduction gear device utilized in an industrial robot that is required to move heavy objects at high speed.

That is, it is possible to mitigate the total amount of heat generated by the reduction gear device by optimizing the distribution of the speed reduction ratios of the first reduction mechanism and the second reduction mechanism, and excessive heating of the lubricant is thus prevented, allowing the stable period in which the pace of abrasion is low to be obtained, which in consequence is possible to suppress the decrease in durability of the reduction gear device that causes the output shaft to revolve rapidly at high torque.

It is thus possible to suppress the decrease in durability of the compact reduction gear device that is utilized in the wrist of the industrial robot to cause the anterior end of the robot arm to revolve rapidly and transmit high torque to the anterior end of the robot arm.

EMBODIMENTS OF THE INVENTION

Some of the features of the embodiments will be given below.

(Feature 1) A reduction gear device wherein the total speed reduction ratio of the reduction gear device may be in the range of 40 to 200, the number of revolutions input to the first reduction mechanism may be 2000 rpm or above, and the number of revolutions output from the second reduction mechanism may be 15 to 60 rpm. In the second reduction mechanism of this reduction gear device, the inner diameter D of the internal gear may be 140 mm≦D≦200 mm, the torque T output from the second reduction mechanism may be 650 Nm≦T≦1570 Nm or 650 Nm≦T≦1960 Nm, and the speed reduction ratio of the second reduction mechanism may be less than 40.

(Feature 2) A reduction gear device wherein the total speed reduction ratio of the reduction gear device may be in the range of 30 to 180, the number of revolutions input to the first reduction mechanism may be 2000 rpm or above, and the number of revolutions output from the second reduction mechanism may be 15 to 60 rpm. In the second reduction mechanism of this reduction gear device, the inner diameter D of the internal gear may be 100 mm≦D≦140 mm, the torque T output from the second reduction mechanism may be 290 Nm≦T<650 Nm, and the speed reduction ratio of the second reduction mechanism may be less than 30.

(Feature 3) A reduction gear device wherein the number of revolutions input to the first reduction mechanism may be 2000 rpm or above, and the number of revolutions output from the second reduction mechanism may be 15 to 60 rpm. The trend in increase of iron powder density in the lubricant sealed within the reduction gear device may be large for the predetermined period from the time when the operation of the reduction gear device begins, and the stable period is obtained after the predetermined period has been passed. The iron powder density in the lubricant when the stable period is reached may be 600 ppm or below.

MODE(S) FOR CARRYING OUT THE INVENTION

First Embodiment

Figure 1:
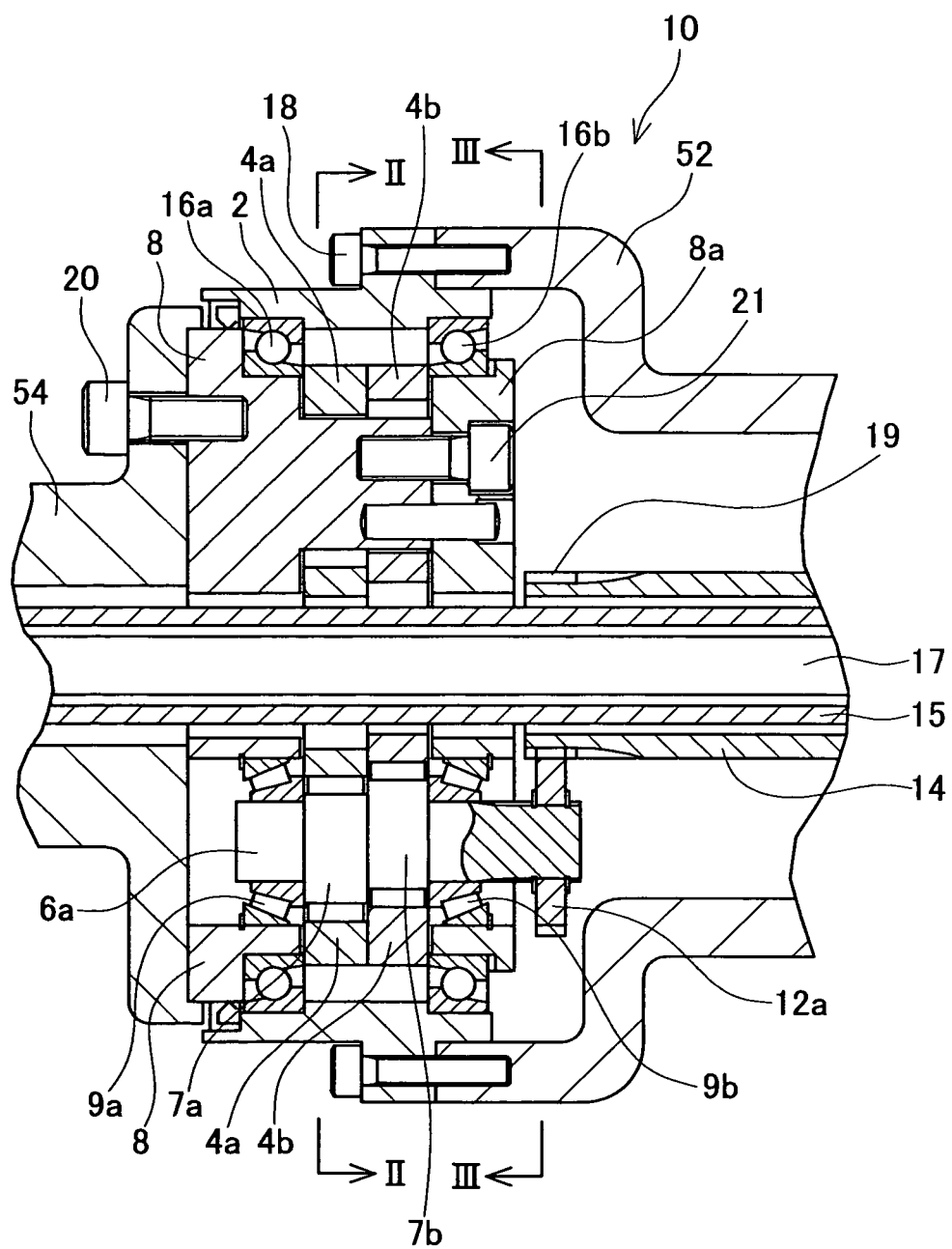
FIG. 1 shows a reduction gear device of a first embodiment.

FIG. 1 shows a cross-sectional view of essential parts of a reduction gear device 10 of the present embodiment. The reduction gear device 10 is designed chiefly for being attached to a fourth joint 34 of an industrial robot 30 of FIG. 4. There may also be a case where the reduction gear device 10 is attached to a fifth joint 35 or a sixth joint 36.

Figure 4:
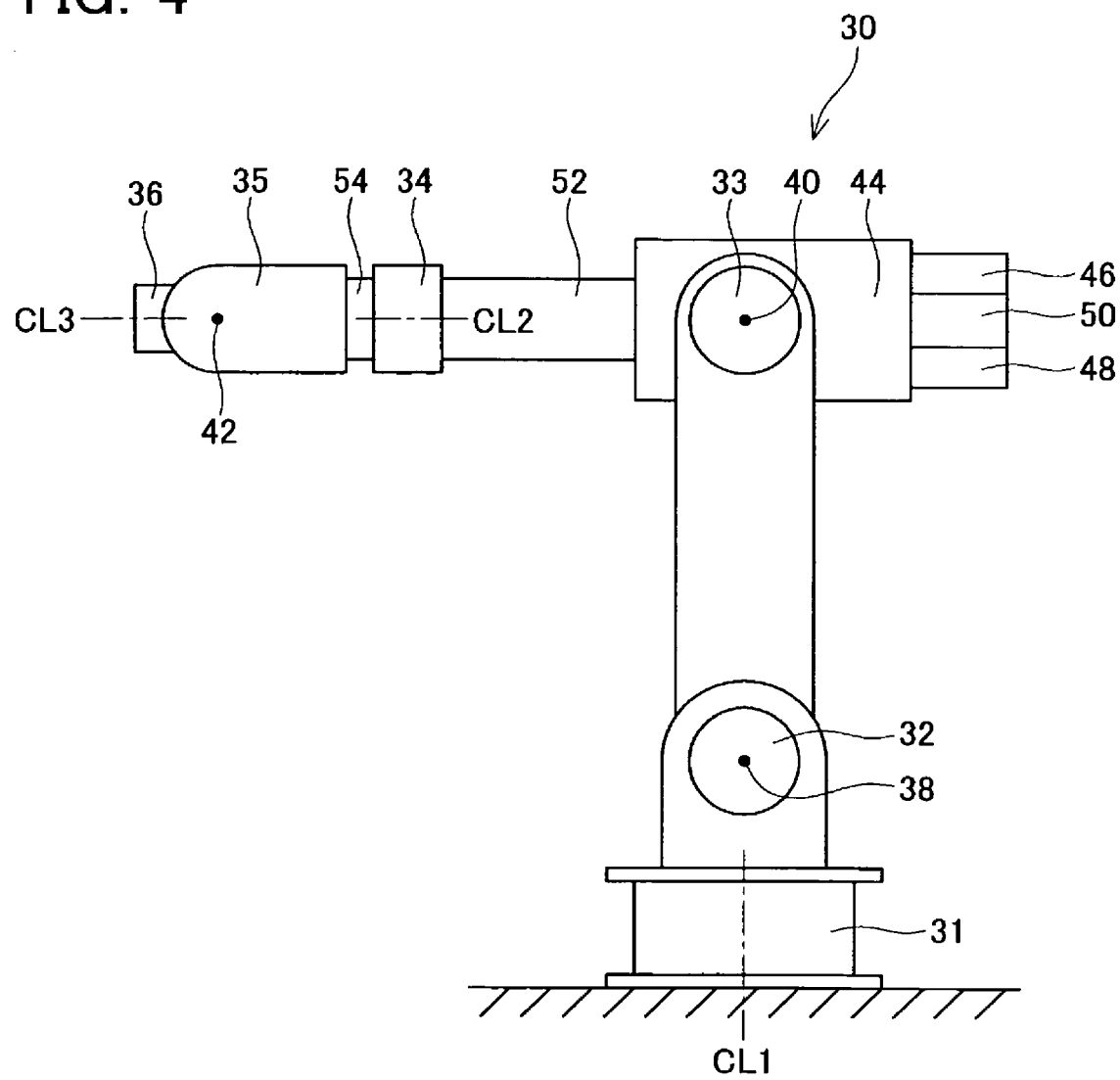
FIG. 4 shows a schematic diagram of an industrial robot.
Figure 5:
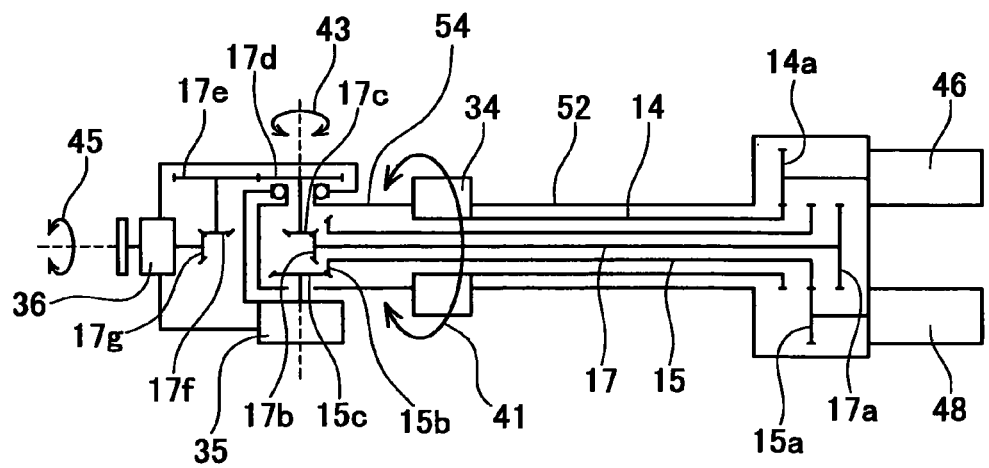
FIG. 5 shows a circuit diagram of three wrist shafts of the industrial robot.
Figure 6:
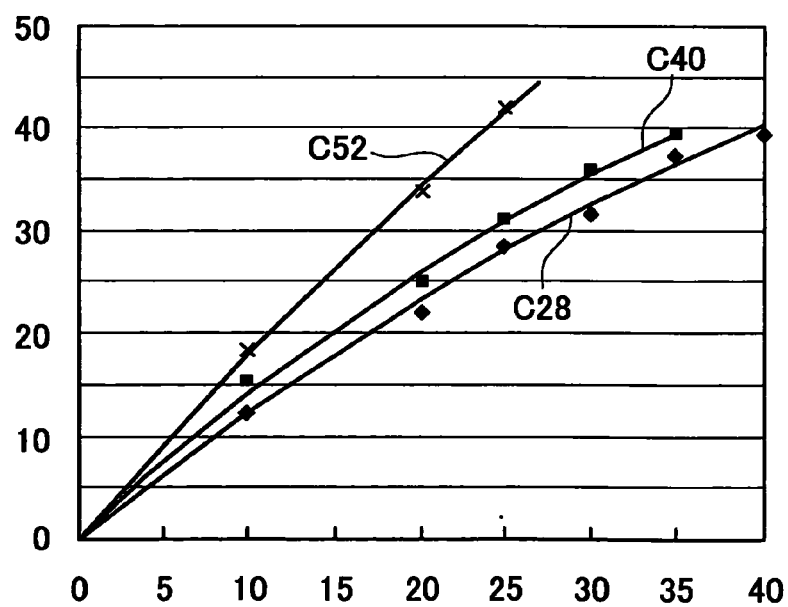
FIG. 6 shows a graph showing a number of output revolutions of the reduction gear device and rise in temperature.

The reduction gear device 10 reduces the number of revolutions of a shaft (input shaft) 14 that is caused to revolve by a motor 46 of FIG. 4, causes an anterior end arm 54 to revolve, and comprises a first reduction mechanism and a second reduction mechanism.

The first reduction mechanism comprises a first spur gear 19 formed at an anterior end of the shaft 14, and second spur gears 12a, 12c, and 12e (see also FIG. 3) that mesh with the first spur gear 19. In the present embodiment, the spur gear 19 has the smallest diameter and number of teeth as possible, whereas the spur gears 12a, 12c, and 12e have the largest diameter and number of teeth as possible. The first reduction mechanism thereby realizes a large speed reduction ratio. Because other shafts (input shafts) 15 and 17 pass through the inside of the shaft 14, the spur gear 19 conventionally had the largest diameter, and the spur gears 12a, 12c, and 12e had the smallest diameter. In the present embodiment, the first reduction mechanism realizes the large speed reduction ratio by decreasing the thickness, etc., of the shaft 14.

The second reduction mechanism comprises crankshafts 6a, 6c, and 6e that rotate integrally with the corresponding spur gears 12a, 12c, and 12e, external gears 4a and 4b (see also FIG. 1), an internal gear 2, and carriers 8 and 8a that support the crankshafts 6a, 6c, and 6e such that these can revolve orbitally around the shaft 14.

The internal gear 2 is attached to a base part arm 52 by bolts 18, and the anterior end arm 54 is attached to the carrier 8 by bolts 20.

Figure 3:
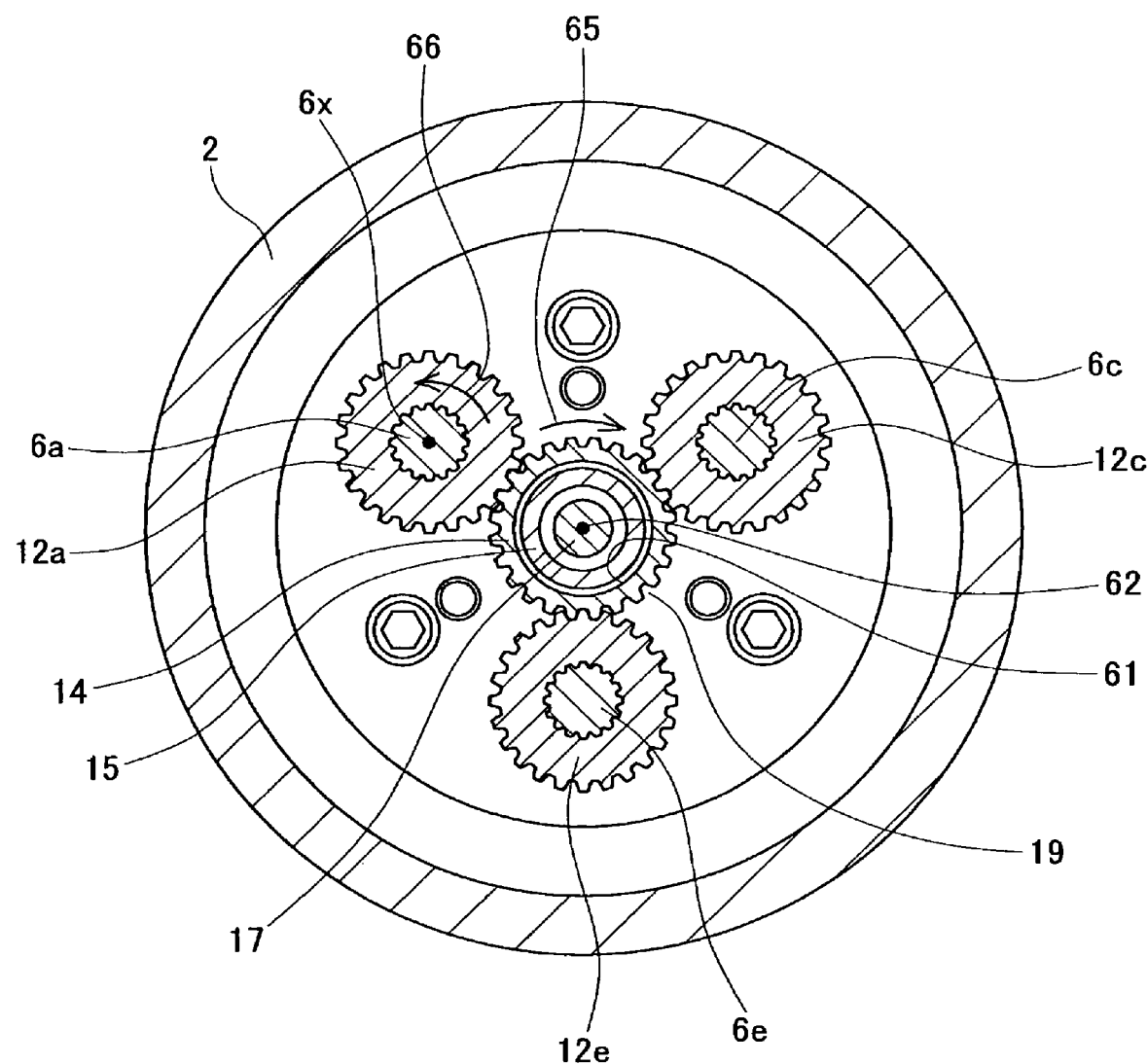
FIG. 3 shows a cross-sectional view along the line III-III of FIG. 1.

FIG. 3 shows a cross-section of essential parts along the line III-III of FIG. 1. The crankshafts 6a, 6c, and 6e are provided within the internal gear 2, and the spur gear 12a is fixed to the crankshaft 6a, the spur gear 12c is fixed to the crankshaft 6c, and the spur gear 12e is fixed to the crankshaft 6e. Each of the spur gears 12a, 12c, and 12e meshes with the spur gear 19 formed at the anterior end of the shaft 14. The shaft 14 is provided with a hollow structure, and a hole 61 is formed along its center axis. The shaft 15 and the shaft 17 pass through the inside of the hole 61.

The crankshafts 6a, 6c, and 6e have basically the same structure. Here, the crankshaft 6a will be described. As shown in FIG. 1, the crankshaft 6a is supported by a pair of tapered roller bearings 9a and 9b so as to be capable of rotating around its center axis 6x (see FIG. 2) and so as to be incapable of moving in its axial direction with respect to the carriers 8 and 8a. Compressing force in the axial direction of the crankshaft 6a is applied from the carriers 8 and 8a to the crankshaft 6a by the pair of tapered roller bearings 9a and 9b, fixing the crankshaft 6a in the its axial direction with respect to the carriers 8 and 8a.

The spur gear 12a is fixed to the crankshaft 6a. The spur gear 12a engages with the shaft 14. The spur gear 19 to be meshed with the spur gear 12a is formed at an outer face of the shaft 14. Force in the axial direction of the crankshaft 6a between the crankshaft 6a and the shaft 14 is not created even if the spur gear 12a and the spur gear 19 are engaged.

Figure 2:
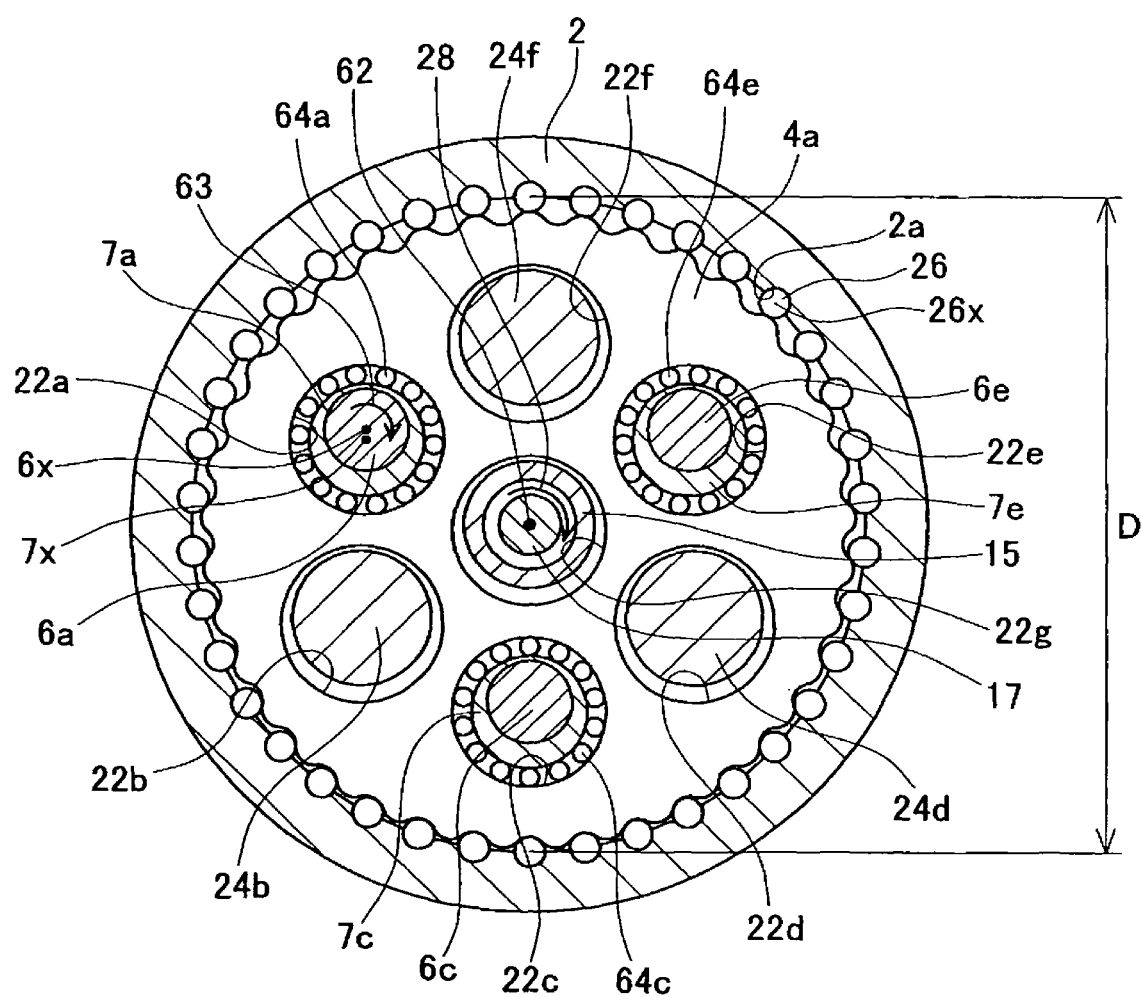
FIG. 2 shows a cross-sectional view along the line II-II of FIG. 1.

FIG. 2 shows a cross-sectional view along the line II-II of FIG. 1. FIG. 2 and FIG. 3 shows the views from opposing directions. The crankshaft 6a is supported so as to be capable of rotating around the center axis 6x of the crankshaft 6a with respect to the carriers 8 and 8a. The reference number 7a refers to an eccentric cam formed at the crankshaft 6a. The outer shape of the eccentric cam 7a is round, and a center axis 7x thereof is offset downward, relative to FIG. 2, from the center axis 6x of the crankshaft 6a. The eccentric cam 7a engages with a hole 22a of the external gear 4a via needle bearings 64a. When the crankshaft 6a rotates around the center axis 6x, the center axis 7x of the eccentric cam 7a revolves orbitally around the center axis 6x of the crankshaft as shown by the arrow 63. When the center axis 7x of the eccentric cam 7a revolves orbitally as shown by the arrow 63, the external gear 4a revolves eccentrically as shown by the arrow 28.

The reference numbers 6c and 6e refer to crankshafts, and the operation and effects thereof are the same as those of the crankshaft 6a. Further, the reference numbers 7c and 7e refer to eccentric cams, and the operation and effects thereof are the same as those of the eccentric cam 7a. Consequently, description of the crankshafts 6c and 6e and the eccentric cams 7c and 7e is omitted.

The carriers 8 and 8a are fixed by bolt 21, and are supported so as to be capable of rotating with respect to the internal gear 2 by a pair of angular ball bearings 16a and 16b. The external gears 4a and 4b are housed within the internal gear 2, and the external gears 4a and 4b overlap with the crankshaft 6a in an orthogonal state thereto.

As shown in FIG. 2, a total of six holes 22a to 22f are formed in a circumference direction in the external gear 4a, and a hole 22g is formed in a central portion of the external gear 4a. The shaft 15 and the shaft 17 pass through the inside of the hole 22g.

The carrier 8 has a column member 24b, a column member 24d, and a column member 24f that respectively extend along the hole 22b, the hole 22d, and the hole 22f. As a result, the external gear 4a is not capable of rotating with respect to the carrier 8, and the carrier 8 also rotates when the external gear 4a rotates.

The external gear 4a has 37 teeth, and the internal gear 2 has 38 teeth. That is, the number of teeth of the external gear 4a is one less than the number of teeth of the internal gear 2. The external gear 4a is capable of revolving orbitally around a center axis 62 as shown by the arrow 28 while the outer teeth along a circumference direction of the external gear 4a and inner teeth pins 26 along a circumference direction of the internal gear 2 are in an interlocked state. The external gear 4a is also capable of revolving eccentrically while revolving orbitally around the center axis 62. The inner teeth pins 26 are not fixed to the internal gear 2, but are disposed within a groove 2a formed in the internal gear 2, and are capable of rotating around a center axis 26x of the inner teeth pins 26. This is the case for all 38 of the inner teeth pins 26. Moreover, as is clear from FIG. 2, all of the inner teeth pins 26 make contact with the external gear 4a. The degree to which the external gear 4a and the internal gear 2 interlocking differs by their position in the circumference direction. The portion where the external gear 4a and the internal gear 2 are most strongly interlocked can be referred to as an "mesh", and can also be referred to as the external gear 4a being meshed locally with the internal gear 2.

A space allowing the orbital revolution 28 of the external gear 4a is maintained between the hole 22b of the external gear 4a and the column member 24b. When the external gear 4a revolves orbitally while the internal gear 2 is in a fixed state, the external gear 4a rotates while revolving orbitally due to the number of teeth of the external gear 4a being less than the number of teeth of the internal gear 2. In the case where the external gear 4a rotates while revolving orbitally, the column members 24b, 24d, and 24f also rotate pursuant to the rotation of the external gear 4a. The number of teeth of the external gear 4a is one less than the number of teeth of the internal gear 2, and since the internal gear 2 has 38 teeth, the external gear has a 1/38 rotation for one orbital revolution of the external gear 4a. Further, the inner diameter of the internal gear 2 is shown by D in the figure, this being the diameter of a circle formed of the centers of the inner teeth pins, and the inner diameter is capable of being selected from 140 mm to 200 mm.

The description above also applies to the external gear 4b. However, the direction of being offset is in the reversed direction. In the state of FIG. 2, the center axis of the eccentric cam 7b for the external gear 4b is offset upward from the center axis 6x of the crankshaft 6a. The center axis 7x of the eccentric cam 7a for the external gear 4a and the center axis of the eccentric cam 7b for the external gear 4b are always positioned symmetrically with respect to the center axis 6x of the crankshaft 6a at the center of the symmetry. That is, in FIG. 2, if the external gear 4a is offset in the left direction, then the external gear 4b is offset in the right direction; if the external gear 4a is offset in the upward direction, then the external gear 4b is offset in the downward direction; if the external gear 4a is offset in the right direction, then the external gear 4b is offset in the left direction; and if the external gear 4a is offset in the downward direction, then the external gear 4b is offset in the upward direction. That is, in view of the entirety of the external gear 4a, the external gear 4b, and the crankshaft 6a, the external gear 4a and the external gear 4b are positioned symmetrically with respect to the center axis 6x of the crankshaft 6a, and a relationship is realized in which revolution balance is maintained.

The operation of the reduction gear device 10 of the present embodiment will now be described. The reduction gear device transmits the torque of the motor 46 to the spur gears 12a, 12c, and 12e via the shaft 14 and the spur gear 19. As shown in FIG. 3, the shaft 14 rotates around the center axis 62 in the direction of the arrow 65, and the spur gear 12a rotates around the center axis 6x of the crankshaft 6a in the direction of the arrow 66. The spur gears 12c and 12e also rotate in the same direction as the spur gear 12a. At this juncture, a first speed reduction is achieved due to the difference in the number of teeth of the spur gear 19 of the shaft 14 and the number of teeth of the spur gears 12a, 12c, and 12e. If the rotation speed input to the first reduction mechanism is R1, then the rotation speed R2 of the spur gears 12a, 12c, and 12e is represented by the following formula:

$$R2 = -(Z1/Z2) \times (R1 - R4) + R4 \qquad (1)$$

In the above formula, Z1 is the number of teeth of the spur gear 19 of the shaft 14, and Z2 is the number of teeth of the respective spur gears 12a, 12c, and 12e. Further, R4 is the orbital revolution speed of the respective spur gears 12a, 12c, and 12e.

The revolution transmitted to the spur gears 12a, 12c, and 12e is transmitted to the crankshafts 6a, 6c, and 6e. When the crankshaft 6a rotates around the center axis 6x, the eccentric cams 7a and 7b are made to revolve orbitally around the center axis 6x. The crankshafts 6c and 6e perform the same operation. As a result, the external gears 4a and 4b revolve orbitally in the direction of the arrow 28. That is, the external gears 4a and 4b revolve eccentrically at the inner side of the internal gear 2 while in meshed state with the internal gear 2. The internal gear 2 is fixed by the bolt 18, and consequently when the external gears 4a and 4b revolve eccentrically while in meshed state with the internal gear 2, the external gears 4a and 4b rotate due to the number of teeth of the external gears 4a and 4b differing from the number of teeth of the internal gear. That is, the external gears 4a and 4b rotate while revolving orbitally. As a result, the column members 24b, 24d, and 24f revolve orbitally around the center axis 62.

The external gears 4a and 4b revolve orbitally while maintaining the symmetrical relationship with respect to the center axis 62. The crankshafts 6a, 6c, and 6e and the external gears 4a and 4b revolve smoothly in a state in which revolution balance is ensured.

Since the orbital revolution speed of the spur gears 12a, 12c, and 12e equals to the rotation speed of the external gears 4a and 4b, the rotation speed R4 of the external gears 4a and 4b is represented by the following formula:

$$R4 = -(Z3 - Z4)/Z4 \times R3 \qquad (2)$$

In the above formula, R3 is the rotation speed of the respective crankshafts 6a, 6c, and 6e, Z3 is the number of teeth of the internal gear 2, and Z4 is the number of teeth of the respective external gears 54a and 54b.

Since the crankshaft 6a and the spur gear 12a are fixed, the crankshaft 6c and the spur gear 12c are fixed, and the crankshaft 6e and the spur gear 12e are fixed, the crankshafts 6a, 6c, and 6e and the corresponding spur gears 12a, 12c, and 12e rotate at the same speed, and consequently the following formula is realized:

$$R2 = R3 \qquad (3)$$

The following formula is realized from the above formulae (1), (2), and (3):

$$R1/R4 = (Z2/Z1) \times (Z3/(Z3 - Z4)) + 1 \qquad (4)$$

Since, in the present embodiment, the number of teeth of the internal gear 2 is 38, and the number of teeth of the external gears 4a and 4b is respectively 37, the following formula is realized:

$$R1/R4 = (Z2/Z1) \times 38 + 1 \qquad (5)$$

Here, Z2/Z1 represents the speed reduction ratio of the first reduction mechanism, and 38 represents the speed reduction ratio of the second reduction mechanism.

The reduction gear device 10 of the present embodiment is capable of achieving the speed reduction ratio represented by formula (5).

(Experiment 1)

Figure 7:
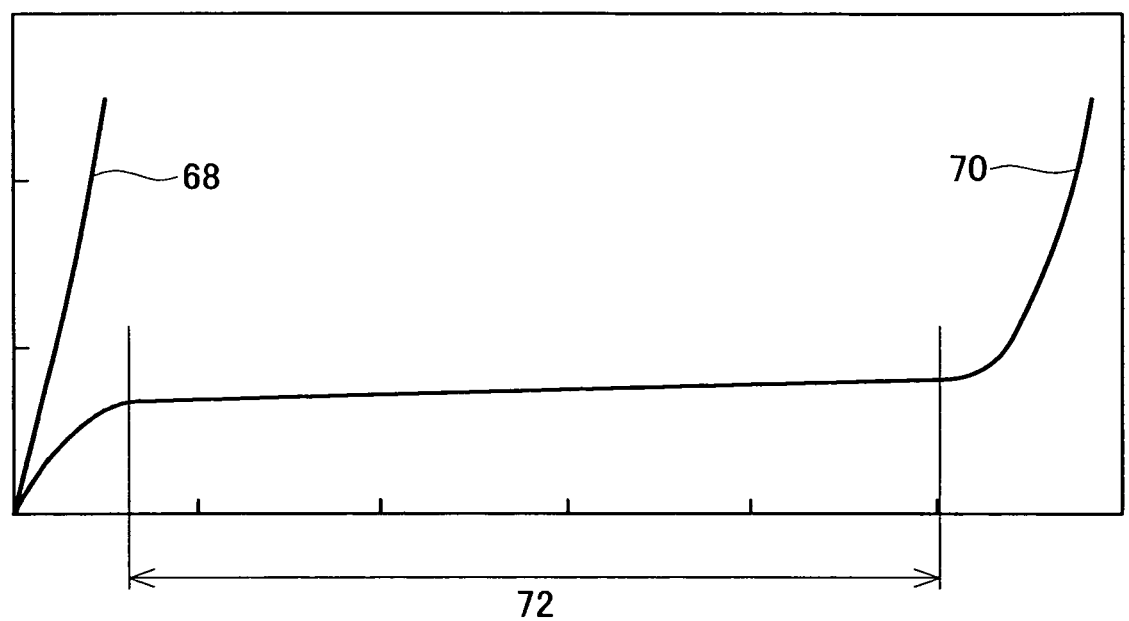
FIG. 7 shows a graph showing the relationship between operating time of the reduction gear device and amount of adulterating iron powder (Experiment 1).

An experiment was conducted concerning the operating time of the reduction gear device 10 and the amount of iron powder generated by the reduction gear device 10 utilizing the reduction gear device 10 of the present embodiment. In the experiment, the output torque of the reduction gear device 10 was 1225 Nm, and the inner diameter D of the internal gear 2 was 179 mm. The curve 70 shown in FIG. 7 shows the results obtained from the experiment. Although the amount of iron powder increases in the curve 70 in proportion with the operating time when operation begins, the curve 70 then has a stable period 72 in which the pace of increase in the amount of iron powder is low. It is shown that there is a stable period in which abrasion of the reduction gear device 10 scarcely progresses even when the reduction gear device 10 operates for a long period. That is, this shows that a stable period is obtained in which operation can continue with a low pace of abrasion even when the reduction gear device 10 operates at high torque, and a decrease in durability can be avoided. Moreover, the total speed reduction ratio of the reduction gear device 10 of the present embodiment is 98, and the number of teeth of the internal gear 2 is 38. Further, it was verified that the stable period 72 having the same trend as the curve 70 could also be obtained when the number of teeth of the internal gear 2 is 30.

The curve 68 was obtained when N≧40 in the case where the output torque of the reduction gear device 10 was 1225 Nm and the inner diameter D of the internal gear 2 was 179 mm. Specifically, the curve is shown in FIG. 7 for the case where N=52 and the total speed reduction ratio is 98 (the same as in the case of the curve 70). Moreover, in the case of N≧40, the pace of increase in the amount of iron powder becomes greater (the slope of the graph increases) as the value of N increases. Since there is no stable period in the curve 68, there is a proportional relationship between the operating time of the reduction gear device and the abrasion of the reduction gear device.

The research of the present inventors verified that the amount of heat generated by the reduction gear device can be lessened by changing the output torque and the inner diameter, and a reduction of the durability of the reduction gear device can thus be suppressed.

In the case where there is a difference of one tooth in the number of teeth of the internal gear and the external gear, if the inner diameter of the internal gear is D, the output torque of the reduction gear device is T and the number of teeth of the internal gear is N, then in the case where 140 mm$\leq$D$\leq$200 mm, and 650 Nm$\leq$T$\leq$1570 Nm, it is possible to decrease the quantity of heat generated by the reduction gear device 10 by selecting N<40, and a reduction of the durability of the reduction gear device 10 can be suppressed. Further, the present inventors verified that in the case where 140 mm$\leq$D$\leq$200 mm, and 650 Nm$\leq$T$\leq$1960 Nm, also, a stable period 72 having the same trend as in the curve 70 can be obtained by selecting N<40.

In the case where 140 mm$\leq$D$\leq$200 mm, and 650 Nm$\leq$T$\leq$1570 Nm, the curve 68 is obtained by selecting N$\geq$40. Since there is no stable period in the curve 68, there is a proportional relationship between the operating time of the reduction gear device and the abrasion of the reduction gear device. Further, as described above, in the case of N$\geq$40, the pace of increase in the amount of iron powder becomes greater as the value of N increases.

It was determined that, in the case where the reduction gear device 10 of the present embodiment is 140 mm$\leq$D$\leq$200 mm, and 650 Nm$\leq$T$\leq$1570 Nm, the durability of the reduction gear device 10 can be increased by selecting N<40. Further, it was determined that in the case where 100 mm$\leq$D<140 mm, and 290 Nm$\leq$T<650 Nm, i.e. in the case where the inner diameter D of the internal gear 2 is small and the output torque is small, the durability of the reduction gear device 10 can be increased by selecting N<30.

In the case where the reduction gear device 10 is 100 mm$\leq$D<140 mm, and 290 Nm$\leq$T<650 Nm, it is necessary when N<30 to further suppress the value of temperature increase of the reduction gear device 10 when the reduction gear device 10 is operating. In the case where the inner diameter D of the internal gear 2 is 140 mm$\leq$D$\leq$200 mm, even if the temperature increase value rise there is a large area for heat dispersal while the reduction gear device 10 is stopped. However, the area for heat dispersal while the reduction gear device 10 is stopped is small in the case where D<140 mm, consequently the reduction gear device 10 is not cooled easily, and the reduction gear device 10 is thus maintained at a high temperature. If the temperature increase value of the reduction gear device 10 becomes too high, the lubricant within the reduction gear device 10 may become heated, and there may be a decrease in lubricant performance. As a result, when N<30 in the case of a small reduction gear device 10, i.e. in the case where 100 mm$\leq$D<140 mm, and 290 Nm$\leq$T<650 Nm, the temperature increase is more suppressed than in the case of N$\geq$30 when the reduction gear device 10 is operated continuously. The temperature increase can be suppressed to within an allowed range even when the reduction gear device 10 is operated continuously, and a reduction in the durability of the reduction gear device 10 can be suppressed.

(Experiment 2)

An experiment was conducted concerning the operating time of the reduction gear device 10 and changes in the density of iron powder generated within the lubricant sealed within the reduction gear device utilizing the reduction gear device 10 of the present embodiment. The experiment was performed dividing the reduction gear device 10 into the following two groups with respect to the output torque T, the inner diameter D of the internal gear, and the number of teeth N of the internal gear.

(1) A group of reduction gear device 10 whose output torque T is 650 Nm$\leq$T$\leq$1570 Nm, the inner diameter D of the internal gear is 140 mm$\leq$D$\leq$200 mm, and the number of teeth N of the internal gear is N<40 (C1, C2, C3).

(2) A group of reduction gear device 10 whose output torque T is 650 Nm$\leq$T$\leq$1570 Nm, the inner diameter D of the internal gear is 140 mm$\leq$D$\leq$200 mm, and the number of teeth N of the internal gear is N$\geq$40 (C4, C5, C6).

Moreover, the lubricant utilized in the present experiment had a friction factor of approximately 0.08.

Figure 9:
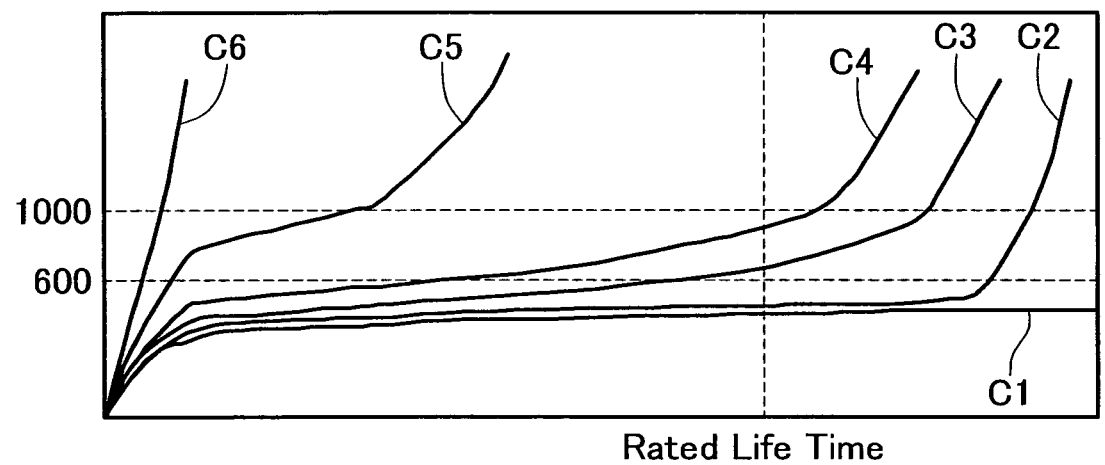
FIG. 9 shows a graph showing the relationship between operating time of the reduction gear device and the density of iron powder (Experiment 2).

As shown in FIG. 9 in curves C1 to C5, the pace of increase in the iron powder density in the lubricant is large for a predetermined period from the time that operation of the reduction gear device 10 begins. Then after the predetermined period has passed the pace of increase in iron powder density becomes slower and a stable period is reached. However, in curve C5 the iron powder density in the lubricant exceeds 600 ppm before the stable period is reached. The stable period of the curve C5 is short, and the iron powder density in the lubricant exceeds 1000 ppm before the operating time has reached the rated life period. As shown by the curves C2, C3, and C4, a sufficiently long stable period can be obtained in the case where the iron powder density exceeds 600 ppm after the stable period has been reached, and consequently the iron powder density in the lubricant does not exceed 1000 ppm when the reduction gear device operates for the rated life period. It was verified that the durability of the reduction gear device 10 will fulfill the rated life period when there is a large pace of increase in the iron powder density for the predetermined period from the time that operation of the reduction gear device 10 begins, and when the iron powder density does not exceed 600 ppm when the predetermined period is passed and the stable period is reached.

The number of teeth of the internal gear is 30 in the case of the curve C1. It was not possible to measure the life of the reduction gear device 10 (the case where iron powder density is 1000 ppm) even after the reduction gear device 10 operated continuously after the rated life period had been exceeded. It was verified that a reduction gear device with outstanding durability could be obtained by selecting 30 as the number of teeth of the internal gear. Moreover, the curve C2 is the same as the curve 70 of FIG. 7, and the curve C6 is the same as the curve 68 of FIG. 7.

The present experiments showed the case where the output torque T of the reduction gear device 10 is 650 Nm$\leq$T$\leq$1570 Nm and the inner diameter D of the internal gear is 140 mm$\leq$D$\leq$200 mm. Although specific results are not shown, it was verified that similar results could be obtained in the case where the output torque T was 650 Nm$\leq$T$\leq$1960 Nm and the inner diameter D of the internal gear was 140 mm$\leq$D$\leq$200 mm. Further, it was verified that similar results could be obtained in the case where the output torque T was 290 Nm$\leq$T$\leq$650 Nm and the inner diameter D of the internal gear was 100 mm$\leq$D<140 mm.

The lubricant utilized in the present experiment had a abrasion factor of approximately 0.08. From the viewpoint of reducing the abrasion caused by movable parts of the reduction gear device, it is preferred that a lubricant is utilized that has a abrasion factor of 0.08 or less, and a friction factor of 0.03 or less is particularly preferred. A lubricant obtained by mixing organic molybdenum and lithium soap with a base oil comprising of synthetic hydrocarbon oil and refined mineral oil, this being set forth in Japanese Patent Application Publication No. 2004-339411, has a friction factor of approximately 0.03. Moreover, the conditions of SRV testing to measure the friction factor of the lubricant are also set forth in the aforementioned application.

As shown by the curve C4, an example was seen in the present experiment where the iron powder density in the lubricant did not reach 1000 ppm while the reduction gear device 10 was operating for the rated life period even in the case where N≧40. However, it was possible to more reliably ensure that the durability of the reduction gear device 10 equaled or exceeded the rated life period by having the number of teeth N of the internal gear 2 be N<40. Moreover, the abrasion of the reduction gear device progresses at an accelerated pace in the curve C2 before the iron powder density reaches 1000 ppm. Since the reduction gear device was made to operate for a long period after the rated life period was exceeded, it was estimated that the pace of abrasion accelerated due to deterioration at locations other than the movable parts.

The following feature was obtained from the iron powder density of the lubricant sealed within the reduction gear device having a large pace of increase for the predetermined period from the time that operation of the reduction gear device begins, then changing to a small pace of increase after the predetermined period has passed, and the iron powder density in the lubricant being less than or equal to 600 ppm when this change in trend occurs.

As described above, the durability of the reduction gear device is required to be equal to or greater than the rated life period. However, when reduction gear devices were manufactured in which the inner diameter D of the internal gear, the required output torque T, and the number of teeth N of the internal gear are all changed, it is difficult to actually test whether the durability of these reduction gear devices fulfilled the rated life period. However, the change in iron powder density in the lubricant occurring until the stable period was reached can comparatively easily be tested. That is, it was easy to assess whether the change in iron powder density in the lubricant was such that the iron powder density exceeded 600 ppm at the time when the stable period was reached.

Second Embodiment

Figure 8:
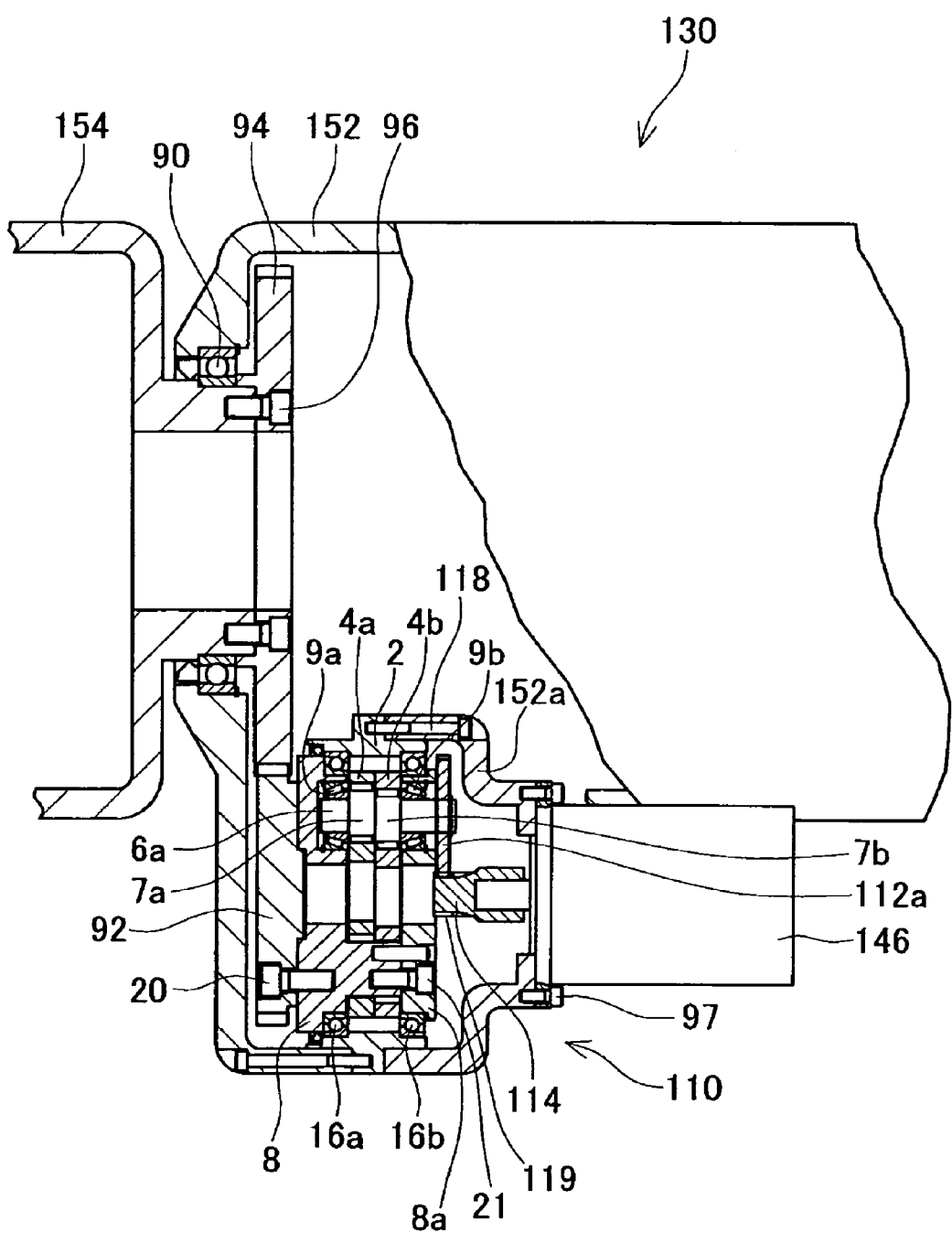
FIG. 8 shows a reduction gear device of a second embodiment.

FIG. 8 shows a cross-sectional view of essential parts of a reduction gear device 110 of a second embodiment. Only parts differing from those of the first embodiment will be described in detail. Parts that are the same as those of the first embodiment have the same reference number applied thereto, and a reduplicated description thereof may be omitted.

The reduction gear device 110 is designed for being attached to a fourth joint of an industrial robot 130, the reduction gear device 110 reducing the number of revolutions of a shaft 114 that is caused to revolve by a motor 146, and causing an anterior end arm 154 to revolve.

The motor 146 is fixed to a fixing part 152a of a base part arm 152 by a bolt 97. The first reduction mechanism comprises a spur gear 119 formed at an anterior end of the shaft 114, and spur gears 112a, 112c, and 112e (though only 112a is shown) that mesh with the spur gear 119.

The carrier 8 of the second reduction mechanism is fixed to a spur gear 92 by bolts 20.

A part of the internal gear 2 is fixed to the fixing part 152a of the base part arm 152 by bolts 118, the anterior end arm 154 is supported on the base part arm 152 by a bearing 90 so as to be capable of rotating, and is fixed by a bolt 96 to a spur gear 94 meshing with the spur gear 92.

In this reduction gear device 110, the shaft 114 that joins the motor 146 and the spur gear 112a is configured to be short.

It is consequently possible to simplify the device. Furthermore, the spur gear 92 and the spur gear 94 are present between the anterior end arm 154 and the carrier 8 that constitutes an output shaft of the reduction gear device 110. It is possible to further decrease the number of revolutions transmitted from the second reduction mechanism to an anterior end side member by adjusting the number of teeth of the spur gear 92 and the spur gear 94, and consequently this has the merit of extending the span of adjustable range of the reduction ratio of the first reduction mechanism and the second reduction mechanism.

The case was described in the aforementioned embodiments where there was a difference of 1 in the number of teeth of the internal gear and the external gear. However, the difference in the number of teeth of the internal gear and the external gear need not necessarily be 1.

For example, in the case where the difference in the number of teeth of the internal gear and the external gear is 2, the external gear has a 2/(number of teeth of the internal gear) rotation for one orbital revolution of the external gear.

In order for a reduction gear device in which the difference in the number of teeth is 2 and a reduction gear device in which the difference in the number of teeth is 1 to have the same speed reduction ratio, the number of teeth of the internal gear of the reduction gear device in which the difference in the number of teeth is 2 may be made to be twice the number of teeth of the internal gear of the reduction gear device in which the difference in the number of teeth is 1. That is, in the case where the difference in the number of teeth is 2, if the inner diameter of the internal gear is D, the output torque of the reduction gear device is T, and the number of teeth of the internal gear is N, it is possible to suppress the reduction in the durability of the reduction gear device by selecting N<80 in the case where 140 mm≦D≦200 mm, and 650 Nm≦T≦1570 Nm.

If N≧80 in the case where 140 mm≦D≦200 mm, and 650 Nm≦T≦1570 Nm, there may be a large reduction in the durability of the reduction gear device in the case where this is utilized at a high operation rate and a high load is transmitted.

In the case where the difference in the number of teeth of the internal gear and the external gear is 2, it is also possible to suppress the reduction in the durability of the reduction gear by selecting N<60 in the case where 100 mm≦D<140 mm, and 290 Nm≦T<650 mm.

In the case where the difference in the number of teeth of the internal gear and the external gear is 3 or more, as well, the same reasons as above come into effect. That is, the difference in the number of teeth of the internal gear and the external gear may be 1, 2, or 3 or more.

Furthermore, the technical elements explained in the present specification and drawings provide technical value and utility either independently or through various combinations. The present invention is not limited to the combinations described at the time the claims are filed.

For example, the external gear forms the output shaft of the torque in the above embodiments. However, the internal gear may form the output shaft of the torque. In this case, the carrier may be fixed to the base part arm of the industrial robot, and a part of the internal gear may be fixed to the anterior end arm.

Further, the purpose of the example illustrated by the present specification and drawings may satisfy multiple objectives simultaneously, and satisfying any one of those objectives gives technical value and utility to the present invention.

The invention claimed is:

1. A reduction gear device to be attached to a robot arm of an industrial robot, the reduction gear device comprising:
a first reduction mechanism that includes a first spur gear that rotates integrally with an input shaft, and a second spur gear that meshes with the first spur gear; and
a second reduction mechanism that includes: (1) a crankshaft that rotates integrally with the second spur gear, and causes, along its rotation, an eccentric revolution of an eccentric cam, (2) an external gear that revolves eccentrically while being engaged with the eccentric cam, and (3) an internal gear that houses the external gear while meshing with the external gear and allows the eccentric revolution of the external gear, wherein the internal gear comprises a number of teeth N differing from a number of teeth of the external gear, wherein
one of the internal gear and the external gear is fixed to a base part side member of the robot arm, and the other of the internal gear and the external gear is fixed to an anterior end side member of the robot arm,
an inner diameter D of the internal gear is 140 mm$\leq$D$\leq$200 mm,
a torque T transmitted to the anterior end side member is 650 Nm$\leq$T$\leq$1960 Nm, and
a trend of increase in density of iron powder in a lubricant sealed within the reduction gear device is a first amount for a predetermined period from a time that operation of the reduction gear device begins, and the trend changes to a second amount less than the first amount after the predetermined period has passed, and the iron powder density in the lubricant is less than or equal to 600 ppm when the change in the trend of increase occurs.

2. The reduction gear device according to claim 1, wherein the torque T transmitted to the anterior end side member is 650 Nm$\leq$T$\leq$1570 Nm.

3. The reduction gear device according to claim 1, wherein the number of teeth N of the internal gear is less than 40 times the difference in the number of teeth between the internal gear and the external gear.

4. The reduction gear device according to claim 1, wherein the lubricant sealed within the reduction gear device is a lubricant obtained by mixing organic molybdenum and lithium soap with a base oil formed of synthetic hydrocarbon oil and refined mineral oil.

5. The reduction gear device according to claim 1, wherein the input shaft includes a first through hole that passes through the center of the input shaft, the external gear includes a second through hole that passes through the center of the external gear, and an input shaft of another reduction gear device is capable of passing through the first and second through holes.

6. The reduction gear device according to claim 1, wherein the difference in the number of teeth of the internal gear and the external gear is 1.

7. A reduction gear device to be attached to a robot arm of an industrial robot, the reduction gear device comprising:
a first reduction mechanism that includes a first spur gear that rotates integrally with an input shaft, and a second spur gear that meshes with the first spur gear; and
a second reduction mechanism that includes: (1) a crankshaft that rotates integrally with the second spur gear, and causes, along its rotation, an eccentric revolution of an eccentric cam, (2) an external gear that revolves eccentrically while being engaged with the eccentric cam, and (3) an internal gear that houses the external gear while meshing with the external gear and allows the eccentric revolution of the external gear, wherein the internal gear comprises a number of teeth N differing from a number of teeth of the external gear, wherein
one of the internal gear and the external gear is fixed to a base part side member of the robot arm, and the other of the internal gear and the external gear is fixed to an anterior end side member of the robot arm,
an inner diameter D of the internal gear is 100 mm$\leq$D$\leq$140 mm,
a torque T transmitted to the anterior end side member is 290 Nm$\leq$T$\leq$650 Nm, and
a trend of increase in density of iron powder in a lubricant sealed within the reduction gear device is a first amount for a predetermined period from a time that operation of the reduction gear device begins, and the trend changes to a second amount less than the first amount after the predetermined period has passed, and the iron powder density in the lubricant is less than or equal to 600 ppm when the change in the trend of increase occurs.

8. The reduction gear device according to claim 7, wherein the number of teeth N of the internal gear is less than 30 times the difference in the number of teeth between the internal gear and the external gear.

9. The reduction gear device according to claim 7, wherein the lubricant sealed within the reduction gear device is a lubricant obtained by mixing organic molybdenum and lithium soap with a base oil formed of synthetic hydrocarbon oil and refined mineral oil.

10. The reduction gear device according to claim 7, wherein
the input shaft includes a first through hole that passes through the center of the input shaft, the external gear includes a second through hole that passes through the center of the external gear, and an input shaft of another reduction gear device is capable of passing through the first and second through holes.

11. The reduction gear device according to claim 7, wherein
the difference in the number of teeth of the internal gear and the external gear is 1.

12. A reduction gear device to be attached to a robot arm of an industrial robot, the reduction gear device comprising:
a first reduction mechanism that includes a first spur gear that rotates integrally with an input shaft, and a second spur gear that meshes with the first spur gear; and
a second reduction mechanism that includes: (1) a crankshaft that rotates integrally with the second spur gear, and causes, along its rotation, an eccentric revolution of an eccentric cam, (2) an external gear that revolves eccentrically while being engaged with the eccentric cam, and (3) an internal gear that houses the external gear while meshing with the external gear and allows the eccentric revolution of the external gear, wherein the internal gear comprises a number of teeth N differing from a number of teeth of the external gear, wherein
one of the internal gear and the external gear is fixed to a base part side member of the robot arm of the industrial robot, and the other of the internal gear and the external gear is fixed to an anterior end side member of the robot arm of the industrial robot,
an inner diameter D of the internal gear is 140 mm$\leq$D$\leq$200 mm,
a torque T transmitted to the anterior end side member is 650 Nm$\leq$T$\leq$1960 Nm, and
the number of teeth N of the internal gear is less than 40 times the difference in the number of teeth between the internal gear and the external gear.

13. The reduction gear device according to claim 12, wherein
the torque T transmitted to the anterior end side member is 650 Nm≦T≦1570 Nm.

14. The reduction gear device according to claim 12, wherein
the number of teeth N of the internal gear is less than 30 times the difference in the number of teeth between the internal gear and the external gear.

15. The reduction gear device according to claim 12, wherein
the input shaft includes a first through hole that passes through the center of the input shaft, the external gear includes a second through hole that passes through the center of the external gear, and an input shaft of another reduction gear device is capable of passing through the first and second through holes.

16. The reduction gear device according to claim 15, wherein
the input shaft that rotates integrally with the first spur gear is arranged outside of the second through hole in an axial direction of the input shaft that rotates integrally with the first spur gear.

17. The reduction gear device according to claim 12, wherein
the difference in the number of teeth of the internal gear and the external gear is 1.

18. A reduction gear device to be attached to a robot arm of an industrial robot, the reduction gear device comprising,
a first reduction mechanism that includes a first spur gear that rotates integrally with an input shaft, and a second spur gear that meshes with the first spur gear, and
a second reduction mechanism that includes: (1) a crankshaft that rotates integrally with the second spur gear, and causes, along its rotation, an eccentric revolution of an eccentric cam, (2) an external gear that revolves eccentrically while engaged with the eccentric cam, and (3) an internal gear that houses the external gear while meshing with the external gear and allows the eccentric revolution of the external gear, wherein the internal gear comprises a number of teeth N differing from a number of teeth of the external gear, wherein
one of the internal gear and the external gear is fixed to a base part side member of the robot arm, and the other of the internal gear and the external gear is fixed to an anterior end side member of the robot arm,
an inner diameter D of the internal gear is 100 mm≦D<140 mm,
a torque T transmitted to the anterior end side member is 290 Nm≦T<650 Nm, and
the number of teeth N of the internal gear is less than 30 times the difference in the number of teeth between the internal gear and the external gear.

19. The reduction gear device according to claim 18, wherein
the input shaft includes a first through hole that passes through the center of the input shaft, the external gear includes a second through hole that passes through the center of the external gear, and an input shaft of another reduction gear device is capable of passing through the first and second through holes.

20. The reduction gear device according to claim 18, wherein
the difference in the number of teeth of the internal gear and the external gear is 1.

* * * * *